United States Patent [19]

Riley et al.

[11] 4,428,900

[45] Jan. 31, 1984

[54] METHOD OF FORMING A PIPE OF ORIENTED THERMOPLASTICS POLYMERIC MATERIAL

[75] Inventors: Jack L. Riley, Sutton Coldfield; Michael C. Lock, Streetly; Jeremy R. Goddin, Coventry, all of England

[73] Assignee: Yorkshire Imperial Plastics Limited, Yorkshire, England

[21] Appl. No.: 268,769

[22] Filed: Jun. 1, 1981

Related U.S. Application Data

[63] Continuation of Ser. No. 42,228, May 4, 1979, abandoned, which is a continuation of Ser. No. 835,897, Sep. 23, 1977, abandoned.

[30] Foreign Application Priority Data

Sep. 23, 1976 [GB] United Kingdom ............... 76/39505

[51] Int. Cl.$^3$ .............................................. B29C 17/07
[52] U.S. Cl. ..................... 264/526; 264/528; 264/535; 264/541; 264/570; 264/573; 264/296
[58] Field of Search ............... 264/296, 541, 570, 573, 264/523, 535, 526, 528; 425/526

[56] References Cited

U.S. PATENT DOCUMENTS

| | | | |
|---|---|---|---|
| 3,873,660 | 3/1975 | Reilly et al. | 264/541 X |
| 3,899,565 | 8/1975 | de Putter et al. | 264/296 |
| 3,949,038 | 4/1976 | McChesney et al. | 264/541 X |
| 4,107,249 | 8/1978 | Murai et al. | 264/296 X |

FOREIGN PATENT DOCUMENTS

| | | | |
|---|---|---|---|
| 72064 | 2/1983 | European Pat. Off. | |
| 2335321 | 7/1977 | France. | |
| 2375973 | 7/1977 | France. | |
| 15868 | 10/1890 | United Kingdom | 264/570 |
| 997551 | 7/1965 | United Kingdom. | |
| 1432539 | 4/1976 | United Kingdom | 264/296 |

OTHER PUBLICATIONS

P. S. Reid and J. D. Cochrane, "Big Blow Moulding," British Plastics, 5-1962, pp. 220-226.

Primary Examiner—Jan H. Silbaugh
Attorney, Agent, or Firm—Cushman, Darby & Cushman

[57] ABSTRACT

A pipe of oriented thermoplastic polymeric material having an integral socket is manufactured by expanding a tubular blank having a portion of greater wall thickness which is positioned in a portion of a female mould defining the socket. The tubular blank is heated by circulation of hot water to a temperature at which deformation will induce oriention of the polymer molecules, and is then expanded radially outwards against the mould by application of internal pressure. In this manner the wall thickness and rigidity of the socket are increased.

8 Claims, 5 Drawing Figures

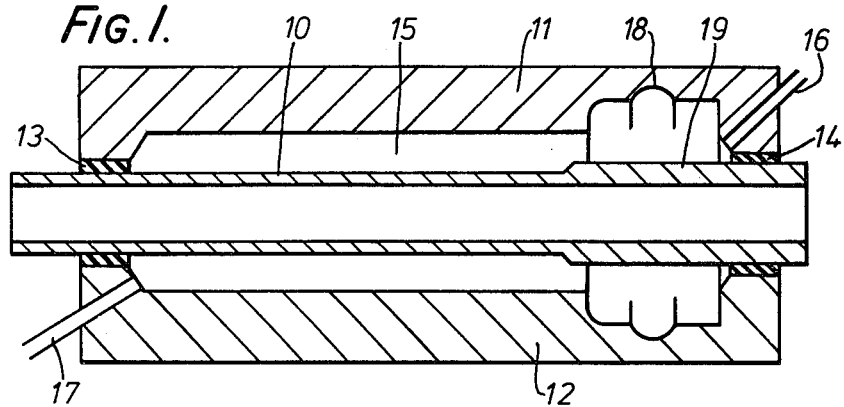
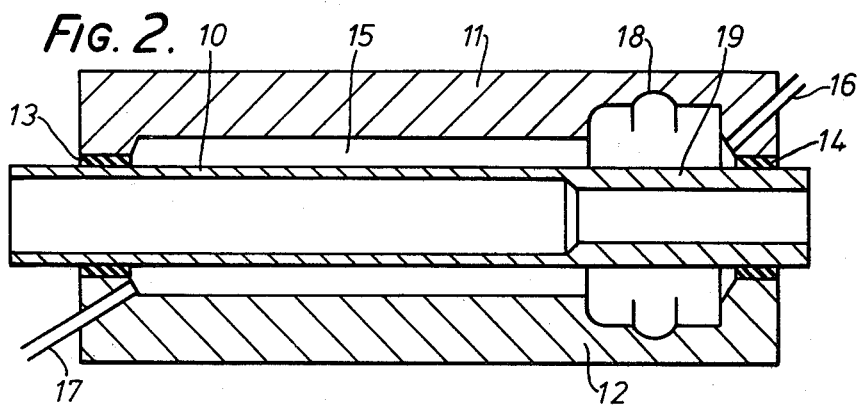
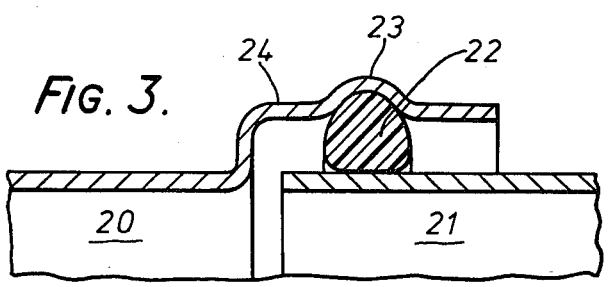

METHOD OF FORMING A PIPE OF ORIENTED THERMOPLASTICS POLYMERIC MATERIAL

This is a continuation of application Ser. No. 42,228 filed May 4, 1979 (now abandoned), which was a continuation of application Ser. No. 835, 897, filed Sept. 23, 1977 (abandoned).

BACKGROUND OF THE INVENTION

The invention relates to a pipe of oriented thermoplastic polymeric material and also to a method of manufacturing such a pipe.

In our UK Pat. No. 1 432 539 we have taught a method of, and apparatus for, forming a pipe from orientable thermoplastic polymeric material by radially expanding a tubular blank into a mould at a temperature at which expansion of the pipe will cause orientation of the polymer molecules. In this manner the finished pipe has an oriented structure capable of withstanding a greater hoop stress for a given wall thickness that a pipe made of the same material which has not been oriented, and has an enlarged oriented socket for carrying a sealing ring. In this manner a pipe was produced with an integral socket having a specified bursting strength with a smaller wall thickness than was previously possible, thereby reducing the volume of plastics used for a given pipe diameter and strength and minimising the cost of the materials required. Such pipes are typically manufactured from PVC, chlorinated PVC, high or low density polyethylene, polypropylene or ABS, although other suitable orientable polymers may be used. As the enlarged socket is of greater diameter than the remainder of the pipe, the wall of the socket is thinner than the pipe wall and consequently more flexible.

In practice we have found that, whilst the reduced rigidity of the socket is not critical, large diameter pipes subjected to high pressures can incur leaks past the socket seal due to the increased flexibility of the thinner socket wall.

SUMMARY OF THE INVENTION

According to one aspect of the invention a method of forming a pipe of orientable thermoplastic polymeric material having an integral socket of enlarged internal diameter includes a tubular blank having a portion of greater wall thickness in a female mould with the portion of greater wall thickness positioned within a portion of the female mould defining the integral socket, heating the tubular blank to a temperature at which deformation will induce orientation of the polymer molecules, applying internal pressure to the tubular blank to expand it radially outwards against the female mould whilst orienting the polymer molecules, the portion of greater wall thickness being expanded into the portion of the female mould defining the socket, cooling the moulded pipe to a rigid condition, and then removing the applied internal pressure. The tubular blank is preferably heated by means of fluid, such as water, at a suitable temperature. The internal pressure is preferably applied by compressed gas or liquid under pressure. The method may also include forming the tubular blank with the portion of greater wall thickness by supporting a tube of constant thickness within a mould defining the portion of greater wall thickness, heating the tube to a moulding temperature, compressing the tube axially within the mould to form the portion of greater thickness, cooling the moulded blank and removing it from the mould.

According to another aspect of the invention a pipe of oriented thermoplastic material has an integral socket of which the cross-section of area is greater than the cross-sectional area taken through another portion of the pipe. The thickness of the socket is preferably equal to, or greater than, the wall thickness of the pipe.

BRIEF DESCRIPTION OF THE DRAWINGS

The invention will now be described by way of example only with reference to the accompanying drawings in which:

FIG. 1 is a cross-section of a mould containing one form of tubular blank;

FIG. 2 illustrates a modification of FIG. 1;

FIG. 3 is an enlarged scrap section of a socket at the end of a pipe produced in accordance with our UK Pat. No. 1 432 539

DESCRIPTION OF THE PREFERRED EMBODIMENT(S)

Figure 4:
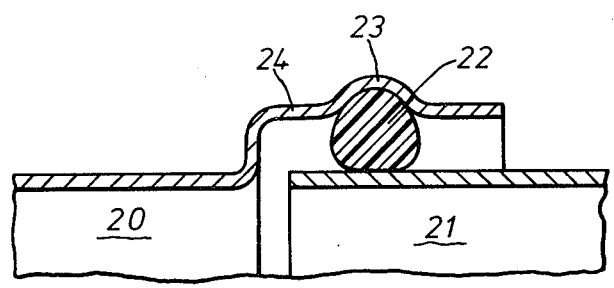
FIGS. 4 and 5 are scrap sections similar to FIG. 3 but illustrating sockets produced at the end of a pipe by the mould of FIG. 1 or FIG. 2.

With reference to FIG. 1, a tubular blank 10 of an unplasticized PVC having a vicat softening point of 82° C. is located inside a split female mould having an upper half 11 and a lower half 12. The blank 10 is sealed into the mould by means of external seals 13 and 14 so that an annular chamber 15 is defined between the outer surface of the blank 10 and the inwardly facing surfaces of the two mould halves 11 and 12. The annular chamber 15 can be filled with hot water through an inlet pipe 16 and drained by an outlet pipe 17. The inwardly facing surfaces of the two mould halves 11 and 12 are generally cylindrical as shown but define at one end an annular recess 18 for forming a socket at the end of the pipe. The two mould halves 11 and 12 would be clamped sealingly together in a convenient manner and are arranged and operated generally as taught in our UK Pat. No. 1 432 539.

However, it will be noted that the external seal 14 has a greater internal diameter than the external seal 13 and engages a portion 19 of the blank 10 which is generally of greater wall thickness. After the mould halves 11 and 12 have been clamped together so that the seals 13 and 14 engage the blank 10, hot water at a temperature of 92° C. is passed through the inlet pipe 16 into the annular chamber 15 and is recirculated, through the outlet pipe 17 and an unshown water heater, back to the inlet pipe 16 for a sufficient time to heat the blank 10 to a temperature between 82° C. and 92° C. at which its expansion wil result in orientation of the polymer molecules. Hot water may also be recirculated through the bore of the blank 10. Once the blank 10 has achieved the required temperature, the water in the annular chamber 15 is completely drained away, and hot water is fed under pressure into the bore of the blank 10 thereby expanding the thicker portion 19 radially outwards into the annular recess 18, and expanding the portion of normal thickness into the cylindrical portion of the mould. In this manner the material of the tubular blank 10 is oriented with a corresponding increase in the hoop strength of the finished pipe. The water pressure applied to the bore of the blank 10 may conveniently be applied to either, or both, ends of the blank through appropriate internal or external seals. After the blank 10 has been fully expanded into the mould 11 and 12, the resultant pipe is cooled in in any convenient manner, for instance by cooling the mould halves 11 and 12 with cold water, or by passing cold water through the bore of the pipe at an appropriate pressure to retain the pipe shape, until its temperature has dropped below the point at which reversion could occur. After the pipe has been cooled, the mould halves 11 and 12 are separated and the formed pipe removed. The formed pipe is then trimmed by removing the surplus material at each end.

Figure 5:
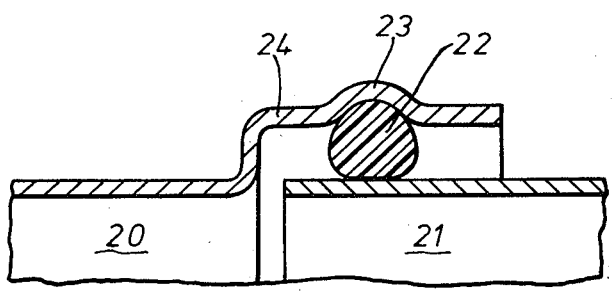

As shown in FIG. 3, two finished pipes 20 and 21 are sealed together by a sealing ring 22 engaged within a recess 23 defined by an integral socket 24 which is of greater diameter than the main cylindrical portions of the pipes 20 and 21. The integral socket 24 shown in FIG. 3 has been formed in accordance with our UK Pat. No. 1 432 539 from a cylindrical blank of constant wall thickness and, as a result, it will be noted that the wall of the integral socket 24 is consequently thinner than the pipe wall. This is because the cross-sectional areas of the integral socket and the pipe wall are equal, and the socket 24 has a greater diameter than the pipe. Although oriention increases the burst strength of the pipe roughly pro rata with the stretch ratio, its effect on stiffness is relatively small. Thus, although the socket 24 will probably have a higher hoop tensile strength than the cylindrical section of the pipe by virtue of its higher stretch ratio, its flexibility will be relatively greater and could lead to displacement of the sealing ring 22 and a consequent failure of the joint under pressure. However, by using the thicker wall portion 19 as described with reference to FIG. 1, the wall thickness of the integral socket 24 can be increased as shown in FIGS. 4 and 5 in which the same reference numerals have been used to identify equivalent components. In FIG. 4 it will be noted that the wall thickness of the socket 24 is equal to the wall thickness of the pipe, and in FIG. 5 it will be noted that the wall thickness of the socket 24 is greater than the wall thickness of the pipe. In fact, the wall thickness of the finished socket 24 can be closely controlled by appropriately selecting the wall thickness of the thicker portion 19 of the tubular blank 10. The axial length and position of the thicker portion 19 can altered from that shown in FIG. 1 to strengthen any specific portion of the finished pipe which it is desired to strengthen.

It will be noted from FIG. 1 that the thicker portion 19 has been formed by locally increasing the outer diameter of the tubular blank 10. FIG. 2 is generally similar to FIG. 1 and the same reference numerals have been used to identify equivalent components. However, it will be noted that the seals 13 and 14 have the same external diameter as the outer diameter of the tubular blank 10 is constant, and the thicker portion 19 is provided by locally decreasing the internal diameter. Whilst the blank 10 shown in FIG. 2 could be manufactured as taught in UK Pat. No. 997 551, it could alternatively be manufactured by heating a tubular blank of constant wall thickness in a mould which defines the internal and external diameters of the thickened end portion 19 and by compressing the tubular blank 10 axially within that mould to define the thickened end portion 19 and by cooling and removing the blank from that mould. The tubular blank 10 illustrated in FIG. 1 could conveniently be made in the same manner.

UK Pat. No. 997 552 teaches how a tubular blank with a thickened end portion can be formed into a non-oriented tube by expanding a core within the thickened portion to define an enlarged coupling socket. Although it has consequently been known for some time that a strengthened coupling socket can be formed at the end of a tube by expanding a tubular blank having a portion of greater wall thickness, it has not previously been proposed to use such a blank in the production of a pipe of oriented thermoplastic polymeric material manufactured, for instance, as taught in our UK Pat. No. 1 432 539. The reason why we have not considered this possibility previously is that it was felt that the application of internal pressure to a tubular blank of non-constant wall thickness would cause the thinner portion of the tube to expand in preference to the thicker portion and that the operation would either be completely uncontrollable or it would not be possible to obtain a product which reflected the dimensional differences present in the blank. To the contrary, we have found that the process in our UK Pat. No. 1 432 539 will expand, in a satisfactory controllable fashion, a tubular blank having a portion of greater wall thickness, and that the result is an oriented pipe having an integral socket of greater rigidity than has hitherto been possible.

The mould used to produce the blank 10 of FIG. 1 does not have to be split in the manner illustrated in the drawing. An alternative mould may be in the form of a tube with an end cap, giving a split at the socket groove.

We claim:

1. A method of forming a tubular blank of thermoplastic polymeric material into a pipe which comprises a tubular section connected to an integral coaxial tubular socket, the internal diameter of said socket being greater than the internal diameter of said tubular section, and the thermoplastic polymeric material constituting both said socket and said tubular section being oriented, using a female mould having a first portion defining the required external configuration of said socket, an axially adjacent second portion defining the required external configuration of said tubular section, and a third portion defining a transition between said first and second portions, said method comprising:
   forming the tubular blank such that it comprises a first longitudinal portion having a greater wall thickness than a second longitudinal portion thereof, said first longitudinal portion having a smaller external diameter than the external diameter of said socket, and said second longitudinal portion having a smaller external diameter than the external diameter of said tubular section;
   positioning the first longitudinal portion of said blank within the first portion of said mould with the second longitudinal portion of said blank being positioned within the second portion of said mould;
   heating the entire tubular blank, whilst so positioned within said mould, substantially uniformly to a temperature at which deformation of the thermoplastic polymeric material of the tubular blank will cause orientation of the polymer molecules, said heating being conducted by contacting the blank with liquid at a suitable temperature, including circulating the heating liquid between the blank and the mould and circulating the heating liquid through the bore of the blank;
   applying fluid pressure to the bore of the heated tubular blank to expand the tubular blank radially outwards against the mould whilst orientating the polymer molecules, the first longitudinal portion of the tubular blank being radially expanded into engagement with the first portion of the mould to form said socket, and the second longitudinal portion of the tubular blank being radially expanded into engagement with the second portion of the mould to form said tubular section;

cooling the expanded tubular blank, whilst the expanded tubular blank remains still pressed against said mould by the fluid pressure, to a temperature at which the expanded tubular blank will not revert to the original shape of said tubular blank when the fluid pressure is removed;

then removing the fluid pressure from the bore of the cooled expanded tubular blank; and then removing the expanded tubular blank from the mould.

2. A method, as in claim 1, including draining the heating liquid away before the blank is radially expanded against the mould.

3. A method, as in claim 1, including increasing the pressure of the heating liquid within the bore of the blank to cause the radially outward expansion.

4. A method, as in claim 1, including forming the blank with the portion of greater wall thickness by supporting a tube of constant thickness within another, initial mould defining the portion of greater wall thickness, heating the tube to a moulding temperature, compressing the tube axially within the mould to form the portion of greater thickness, cooling the moulded blank, and removing the cooled moulded blank from the mould.

5. A method, as in claim 1, further including:

forming the tubular blank from a tube of which the internal and external diameters are the same as those required by the second longitudinal portion of the tubular blank, including supporting said tube in an initial mould defining the internal and external diameters required by the first longitudinal portion of the tubular blank, heating the portion of the tube within said initial mould to a moulding temperature, and compressing the tube axially within the mould to form the first longitudinal portion of the tubular blank.

6. A method, as in claim 1, further including:

supporting both longitudinal ends of the tubular blank from the mould whereby the tubular blank is located co-axially with the mould, and trimming these ends of the expanded tubular blank after removal of the expanded tubular blank from the mould.

7. A method, as in claim 6, including:

supporting said longitudinal ends of the tubular blank from the mould by respective seals which engage the external periphery of the tubular blank.

8. A method, as in claim 1, including:

positioning the first longitudinal portion of said blank within both the first and third portions of said mould.

* * * * *